United States Patent
Cheng (10) Patent No.: US 7,458,085 B2
(45) Date of Patent: Nov. 25, 2008

(54) METHOD FOR OPENING TRAY DOOR OF OPTICAL DISC DEVICE AND ITS STRUCTURE

(75) Inventor: Yi Wen Cheng, Taipei (TW)

(73) Assignee: Lite-On It Corporation, Taipei (TW)

( * ) Notice: Subject to any disclaimer, the term of this patent is extended or adjusted under 35 U.S.C. 154(b) by 505 days.

(21) Appl. No.: 11/201,159

(22) Filed: Aug. 11, 2005

(65) Prior Publication Data

US 2006/0289527 A1 Dec. 28, 2006

(30) Foreign Application Priority Data

May 19, 2005 (TW) ................ 94116287 A (51) Int. Cl.
*G11B 33/02* (2006.01)
*E05D 7/04* (2006.01)

(52) U.S. Cl. ................ 720/647; 16/357; 49/254; 49/257; 49/398

(58) Field of Classification Search ........... 720/644, 720/646, 647; 16/357, 389; 49/254, 257, 49/258, 398; 403/59, 61; 312/325

See application file for complete search history.

(56) References Cited

U.S. PATENT DOCUMENTS

| | | | | | |
|---|---|---|---|---|---|
| 4,530,081 | A | * | 7/1985 | Sakurai et al. | 720/647 |
| 5,223,670 | A | * | 6/1993 | Hogan et al. | 174/368 |
| 5,970,036 | A | * | 10/1999 | Matsugase | 720/614 |
| 6,169,720 | B1 | * | 1/2001 | Kamemura et al. | 720/605 |
| 7,055,160 | B1 | * | 5/2006 | Tan et al. | 720/647 |
| 2002/0122370 | A1 | * | 9/2002 | Sasaki et al. | 369/75.1 |
| 2005/0257231 | A1 | * | 11/2005 | Hibi | 720/647 |

FOREIGN PATENT DOCUMENTS

| | | | |
|---|---|---|---|
| JP | 2002101984 A | * | 4/2002 |
| JP | 2005063642 A | * | 3/2005 |

* cited by examiner

*Primary Examiner*—William J Klimowicz
(74) *Attorney, Agent, or Firm*—Troxell Law Office, PLLC (57) ABSTRACT

The present invention relates to a method for opening a tray door of an optical device. The method comprises the steps of first driving the tray door to move horizontally and attain to a position that no interference between the tray door and a front panel occurs, and then driving the tray door to spin outwardly to allow the tray carrying out. The present invention also relates to a tray door opening structure used in the above method.

5 Claims, 7 Drawing Sheets

METHOD FOR OPENING TRAY DOOR OF OPTICAL DISC DEVICE AND ITS STRUCTURE

This Non-provisional application claims priority under 35 U.S.C. §119(a) on Patent Application No(s). 094116287 filed in Taiwan, Republic of China on May 19, 2005, the entire contents of which are thereby incorporated by reference.

FIELD OF THE INVENTION

The present invention relates to a method and a structure for opening a tray door of optical disc device, more particularly to a method and a structure for opening a tray door of optical disc device which effectively avoid the interference of the tray door with a front panel.

DESCRIPTION OF RELATED ART

With increasing the requirements of delicacy for electronic product, design of optical disc devices is intended to have a more attractive appearance such as a unique and delicate appearance to increase the customer's attention.

Current optical disc devices, according its manner for carrying the disc tray, are classified into a cover-lifting, slot-in, single-disc tray, and multi-disc tray types optical disc devices. Among them, the tray carrying mechanism of the single-disc tray type optical disc device mainly comprises a tray for carrying the optical disc and a tray door for providing dust-proof effect. The action of the tray carrying mechanism is generally driven by electronic and/or mechanical functions. In such a single-tray type optical disc device, the tray door is provided on either the front end of the tray or the front panel of the disc device. If the tray door is provided on the front end of the tray, the tray door moves along with the carrying in/out of the tray. If the tray door is provided on the front panel of the disc device, the tray door turns upwardly or downwardly to allow the tray carrying in/out from the device.

Figure 1:
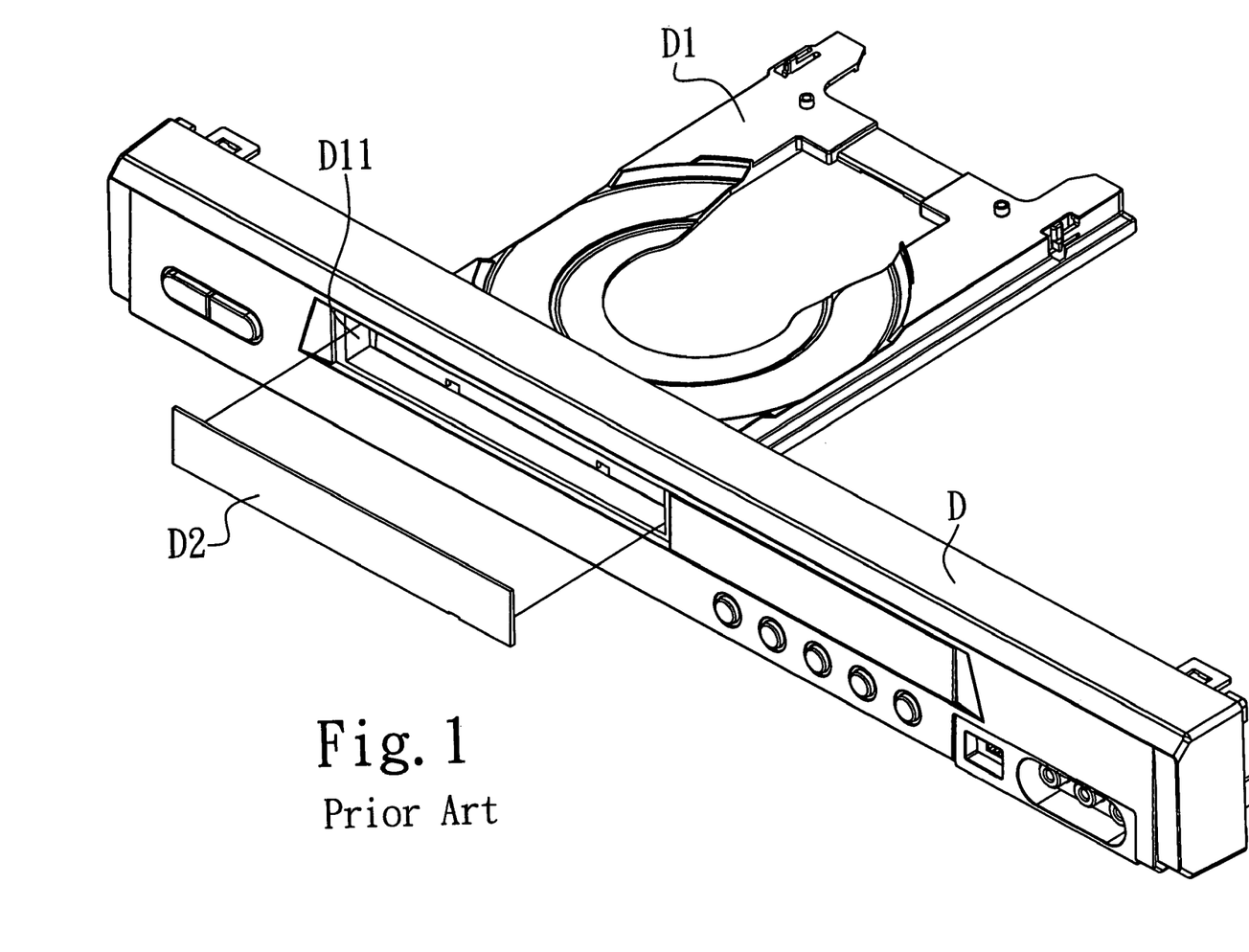
FIG. 1 is a schematic view showing a conventional tray door opening structure.

The single-tray type optical disc device, as shown in FIG. 1, includes a front panel D provided on the front face of the device and an tray in-out window D11 for allowing a tray D1 passing through therein, thereby the tray D1 would pass through the tray in-out window D11 to allow user to place, substitute, or remove the disc. Moreover, for attaining the anti-dust purpose, a tray door D2 is provided on the front end of the tray. When the tray has been carried in the device, the tray door D2 covers the tray in-out window D11 to prevent dust entering and to provide a decorative effect.

However, although the tray door D2 could provide dust-proof and decorative effects, since the tray door D2 is provided on the front end of the tray and moves along with the tray moving, in practice assembling, the interference between the tray door D2 and the tray in-out window D11 would be occurred. The reason is the cumulative tolerance occurred during assembling so that interference between the tray door D2 and the tray in-out window D11 would be occurred when the tray is carrying into the device.

Figure 2:
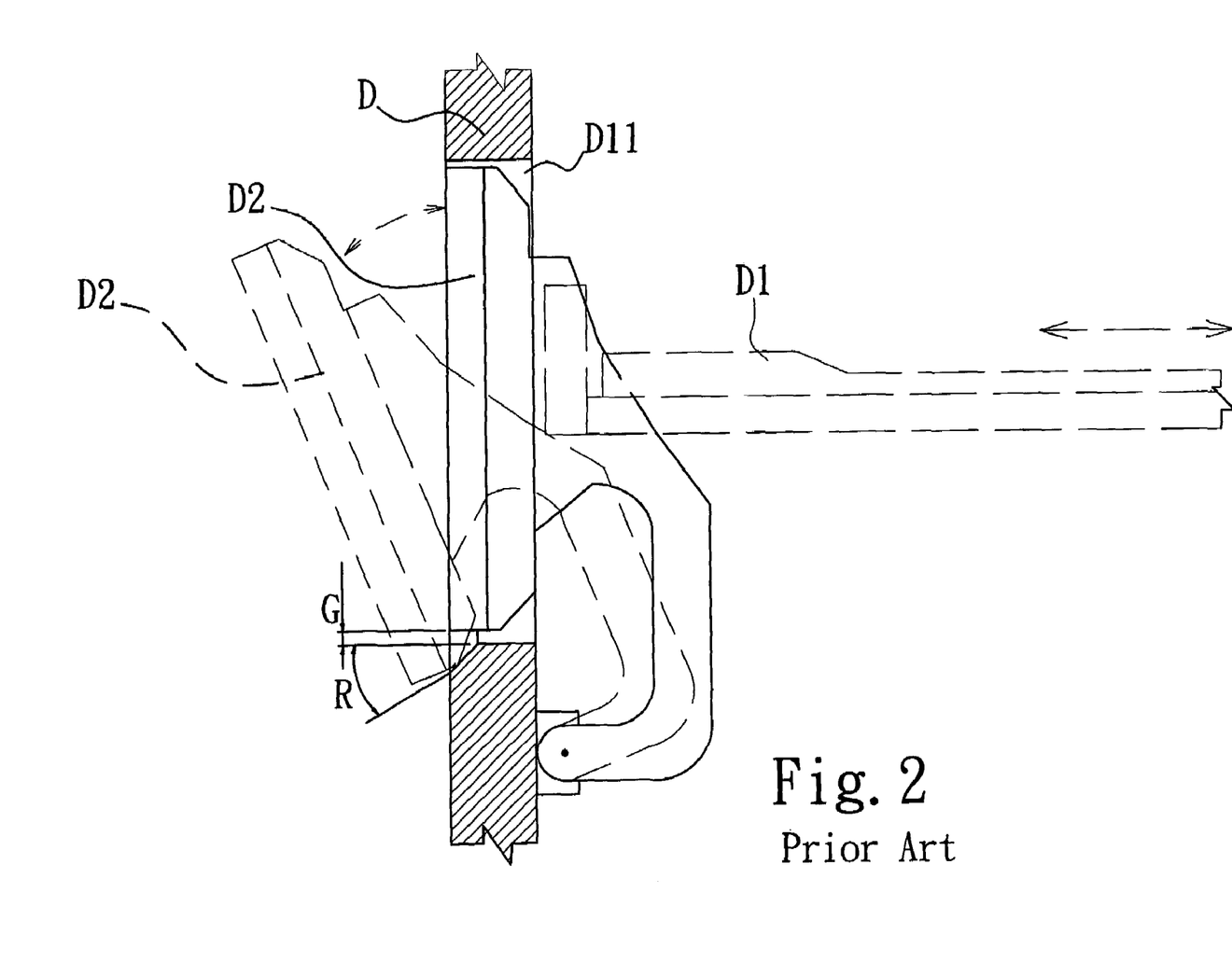
FIG. 2 is a cross-sectional view showing another conventional tray door opening structure in working.

To resolve the above mentioned problems, a structure is designed in which the tray door D2 is provided on the front panel of the optical disc device, as shown in FIG. 2. In this structure, when the tray D1 is carried out the tray in-out window D11, the tray D1 pushes the tray door D1 to turn outwardly and allow the tray D1 carrying out. Then, when the tray D1 is carried into the device, the tray door D2 turns back to cover the tray in-out window D11 to provide the dustproof and decoration effects.

Such a structure in which the tray door is provided on the front panel avoids the occurrence of interference between the tray door D2 and the tray in-out window D11. However, to allow the tray door D2 rotating outwardly and smoothly, there should be a large gap (G) between the tray door D2 and the tray in-out window D11, as shown in FIG. 2, and one side of the tray in-out window D11 should be provided with a guiding slope R to avoid the interference between the tray door D2 and the window D11 when the tray door D2 is rotating.

However, the large gap G would give a feeling that the product is not delicate and has a design defect regarding product appearance. Moreover, such a structure encounters a problem that electric wave would transfer into the optical disc device through the large gap G during being subjected to EMI (Electromagnetic Interference) test. Therefore, it is possible to interfere in the normal operation of the optical disc device and further cause the damage of the parts assembled in the device.

Therefore, the objects of the present are to attain how to reduce the gap between the tray door and the front panel and how to eliminate the interference between them.

SUMMARY OF THE INVENTION

The one object of the present invention is to provide a method for opening a tray door and a structure used in the method, which method could effectively avoid the interference between the tray door and the front panel while reduce the gap between the tray door and the front panel to improve the product delicacy.

To achieve the above objects, the present provides a method for opening a tray door of an optical device, which comprises the steps of:

(a) driving the tray door to move horizontally to a position not interfering with the front panel of the device; and (b) driving the tray door to spin outwardly in a certain angle to allow the tray carrying out.

In the present invention, the term "outwardly" used herein means the direction away from the device and the term "inwardly" used herein means the direction close to the device.

To achieve the above objects, the present invention also provides a tray door opening structure for an optical disc device, the tray door opening structure is provided on a front panel of the device, the structure comprises: a tray door; at least one guiding block; at least one first elastic member; and at least one second elastic member;

in which the tray door is provided with at least one rotating arm, and one end of the rotating arm is further provided with a hinge;

the guiding block is provided on the inner wall of the front panel and has a guiding trench and the hinge is moveably disposed in the guiding trench;

the first elastic member is provided in the guiding trench and positioned between the front panel and the hinge;

the second elastic member is disposed on the hinge and has a first end and a second end, wherein the first end is fixed on the rotating arm and the second end is a free end.

Thereby when the tray is carried out, the tray pushes the tray door to allow the hinge moving along the guiding trench to compress the first elastic member and guide the tray door moving outwardly and horizontally, then the second end of the second elastic member is against on the inner side of the front panel to allow the tray door spinning and opening by taking the hinge as a spinning axial.

According to the tray door opening structure of the present invention, the coefficient of elasticity of the second elastic member is larger than that of the first elastic member.

According to the tray door opening structure of the present invention, the first elastic member is a tension spring.

According to the tray door opening structure of the present invention, the second elastic member is a torsion spring.

According to the tray door opening structure of the present invention, the guiding trench is provided on the guiding block in a horizontal direction.

BRIEF DESCRIPTION OF DRAWINGS

The present invention is illustrated more detail by reference to the accompanying drawings, wherein.

DETAILED DESCRIPTION OF THE INVENTION

The present invention is illustrated in more detail by reference the following embodiments which are only used for illustration without limiting the scope of the present invention.

Figure 3:
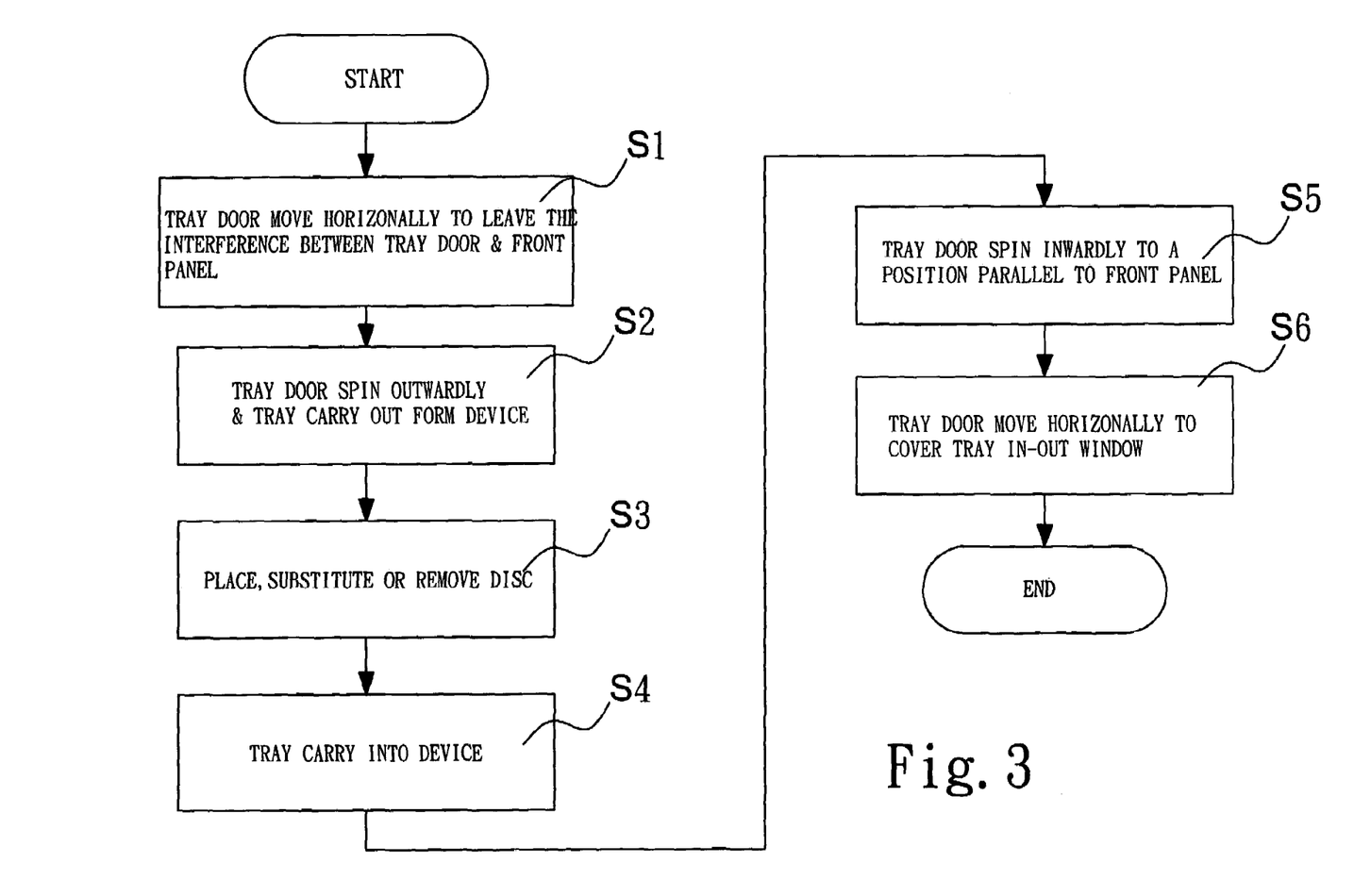
FIG. 3 is a flow chart showing the method for opening tray door according to the present invention.

Please refer to FIG. 3. FIG. 3 is a flow chart showing the method for opening tray door according to the present invention.

According to the method for opening a tray door of the present invention, when the tray is driven to carry out from the disc device, the tray would first push the tray door moving horizontally to a position that no interference between the tray door and the front panel occurs (Step S1). Then, the tray keeps carrying out and allows the tray door spinning outwardly and opening and then the tray is smoothly carried out from the device (Step S2).

According to the method for opening a tray door of the present invention, it can effectively avoid the occurrence of the interference between the tray door and the front panel under a minimal gap between the tray door and the tray in-out window.

Moreover, after the tray door opening completely, the tray is carried out from the device through the window to place, substitute, and remove a disc (Step S3). When the tray is carried into the device (Step S4), the tray door first spins inwardly to a position where the tray door is parallel to the front panel (Step S5), then the tray door moves horizontally back to the device and cover the window (Step S6).

Figure 4:
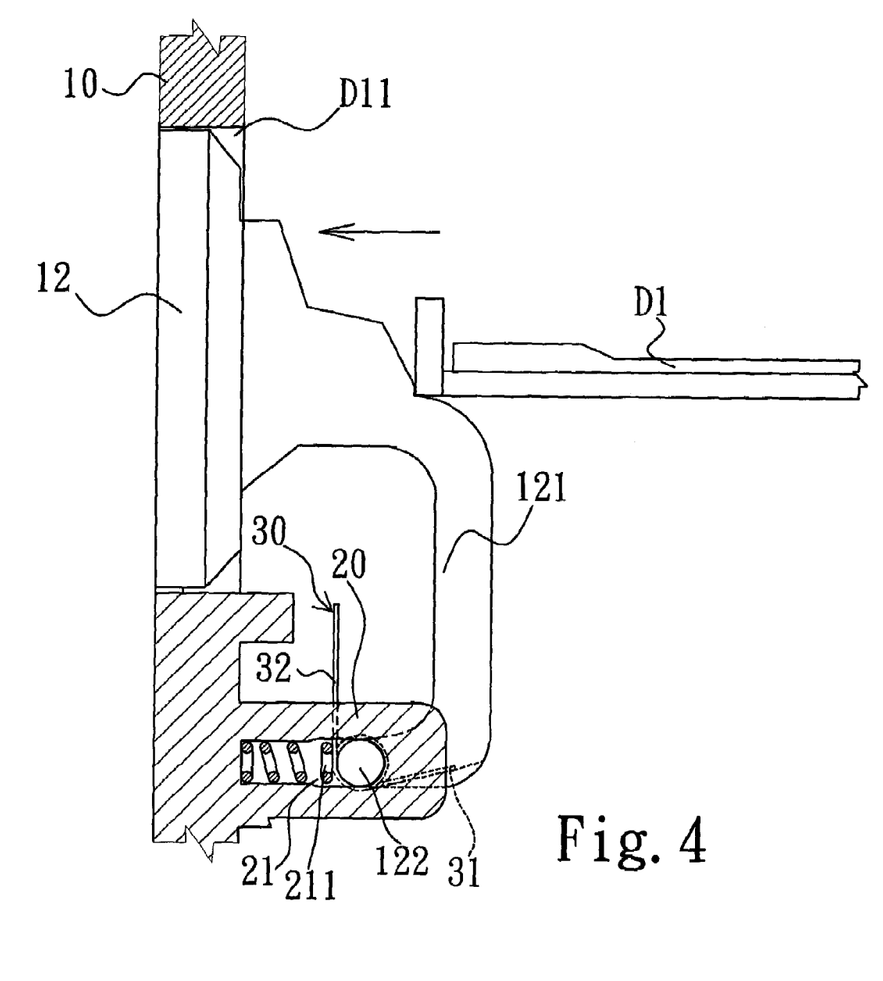
FIG. 4 is a cross-sectional view showing one embodiment of the tray door opening structure according to the present invention.
Figure 5:
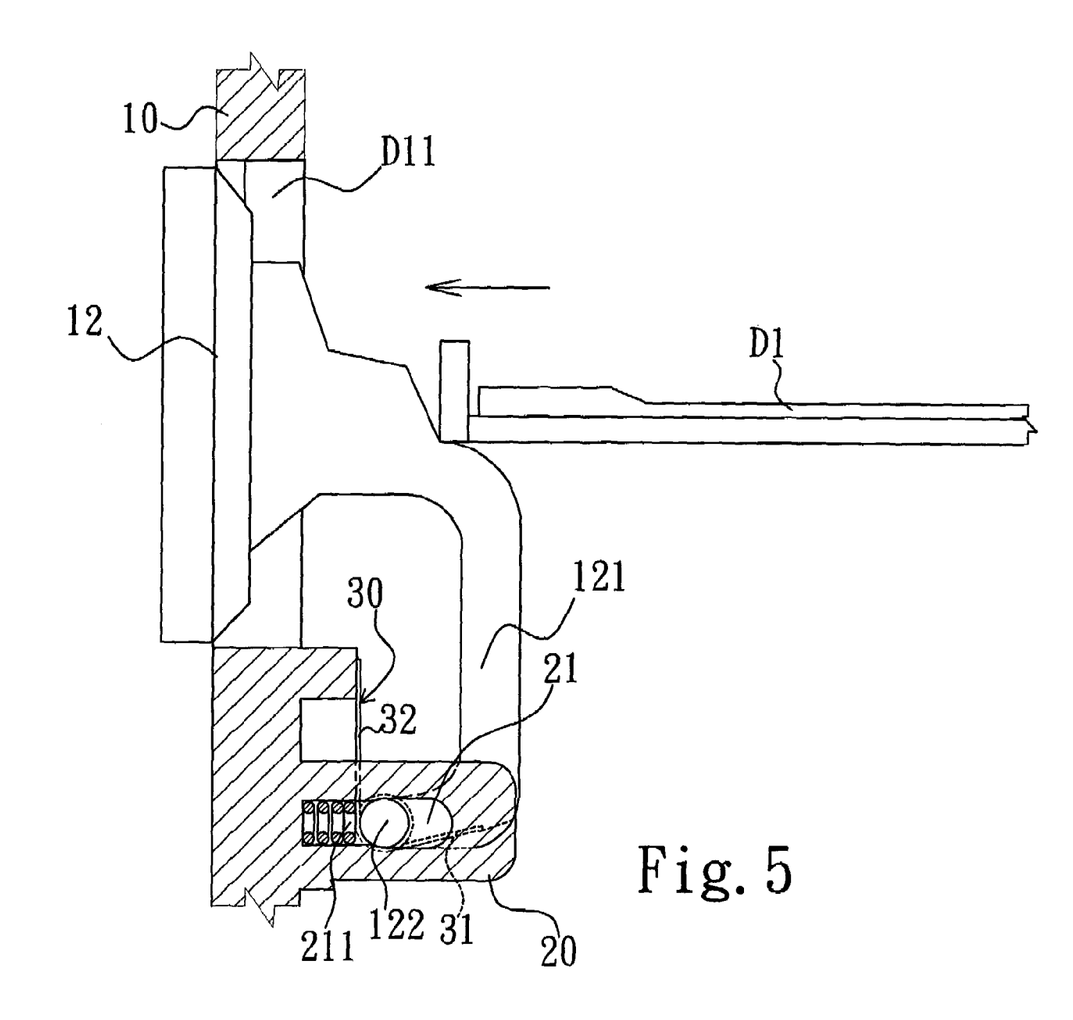
FIG. 5 is a cross-sectional view showing the tray door opening structure in FIG. 4 in which the tray door moves outwardly and horizontally.
Figure 6:
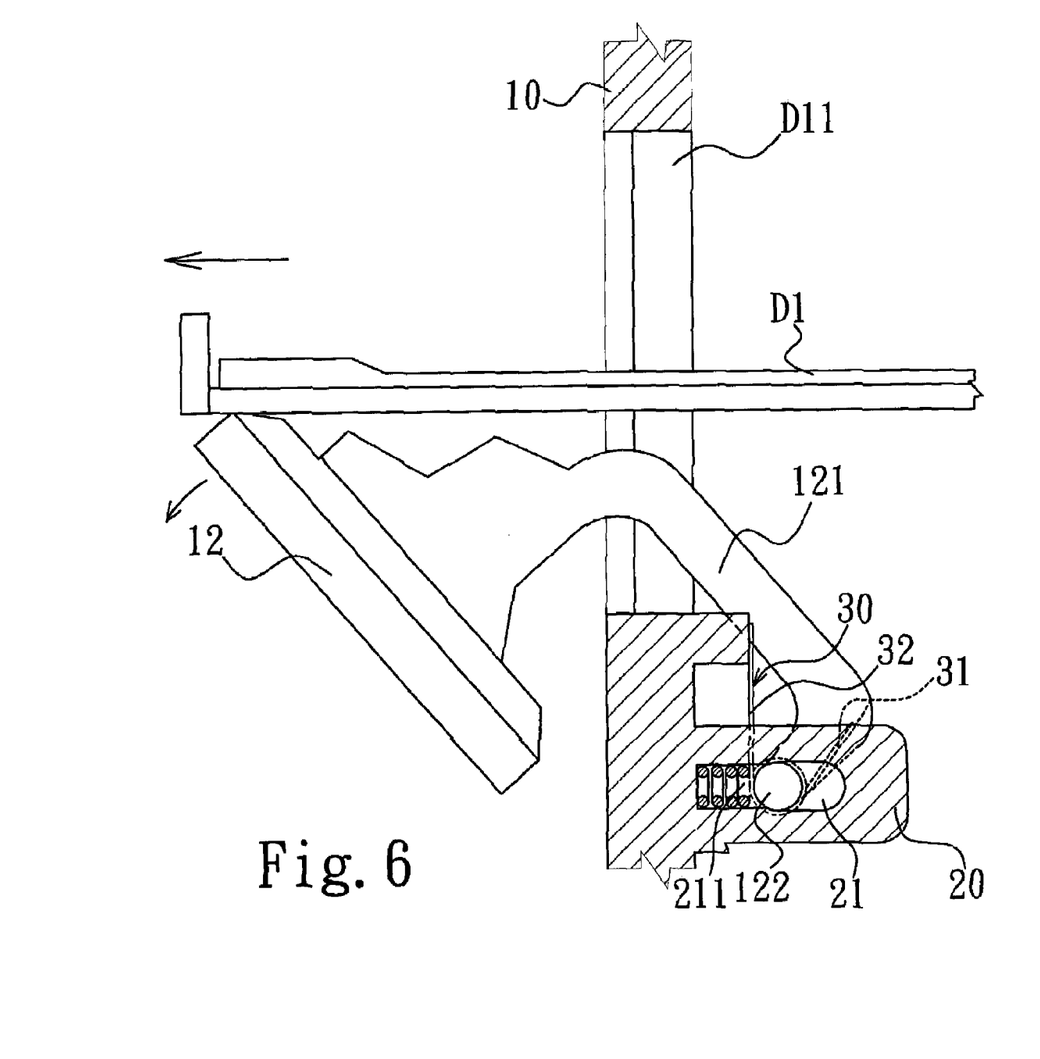
FIG. 6 is a cross-sectional view showing the tray door opening structure in FIG. 5 in which the tray door spins outwardly.

Please refer to FIGS. 4, 5, and 6. FIG. 4 is a cross-sectional view showing one embodiment of the tray door opening structure according to the present invention. FIG. 5 is a cross-sectional view showing the tray door opening structure in FIG. 4 in which the tray door moves outwardly and horizontally. FIG. 6 is a cross-sectional view showing the tray door opening structure in FIG. 5 in which the tray door spins outwardly. As shown in FIG. 4, the tray door opening structure for an optical disc device of the present invention is provided on the front panel 10 of the device, the front panel 10 is formed with a tray in-out window D11 for allowing the tray carrying in/out from the device.

According to the first embodiment, the tray door opening structure comprises a tray door 12, a pair of guiding blocks 20, a pair of first elastic members 211, and a pair of second elastic members 30; wherein a pair of rotating arms 121 is provided on the inner wall of the front panel 10 and one end of each rotating arm 121 is provided with a hinge 122.

Each guiding block 20 is provided on the inner wall of the front panel 10 and is provided with a guiding trench 21 in a horizontal direction. The hinge 122 of the rotating arm 121 is correspondingly assembled in the guiding trench 21 and moves in and along the guiding trench 21. Thus the tray door 12 is driven to move in a horizontal direction.

Each first elastic member 211 is also assembled in the guiding trench 21 and positioned between the front panel 10 and the hinge 122 to provide elasticity for pushing the hinge 122 moving horizontally.

Each second elastic member 30 is disposed on the hinge 122 and has a first end 31 and a second end 32, wherein the first end 31 is fixed on the rotating arm 121 and the second end 32 is a free end.

According to this embodiment, the first elastic member 211 is a tension spring and the second elastic member 30 is a torsion spring. Also, according to the present tray door opening structure, the coefficient of elasticity of the second elastic member 30 is larger than that of the first elastic member 211.

According to this embodiment, when the tray D1 is carried out from the device, it would push the tray door 12 to allow the hinge 122 moving along the guiding trench 21 and pressing against the first elastic member 211 in the guiding trench 21. Thus the tray door 12 moves horizontally at a certain distance to a position that no interference between the tray door 12 and the front panel 10 occurs, as shown in FIG. 5. In this time, the second end 32 of the second elastic member 30 is moved to press against the front panel 10 and the tray D1 keeps pushing the tray door 12 to allow the tray door 12 spinning outwardly by taking the hinge 122 as a spinning axial and then opening. Thus the tray D1 is carried out from the device through the tray in-out window D11, as shown in FIG. 6.

According to the present tray door opening structure, the guiding block 20 can be provided on the inner wall of the front panel 10 either below or above the window D11.

According to this embodiment, in case of that the tray D1 pushes the tray door 12, since the coefficient of elasticity of the second elastic member 30 is larger than that of the first elastic member 211, before the tray D1 carrying out to the position that no interference occurs, the second elastic member 30 is not working. Thus, when the tray D1 pushes the tray door 12, the first elastic member 211 is first compressed and deformed. In this time, the second end 32 of the second elastic member 31 arrives and is against the front panel 10, and the tray D1 keeps moving and pushing the tray door 12 to allow the door 12 spinning outwardly and opening. Finally, the tray D1 is smoothly carried out.

When the tray door 12 is intended to be carried into the device, the elasticity attributed by the second elastic member 30 first allows the tray door 12 spinning back to the position where the tray door 12 is parallel to the front panel 10, then the elasticity attributed by the first elastic member 211 allows the tray door 12 moving horizontally back to the device and covering the window D11.

Figure 7:
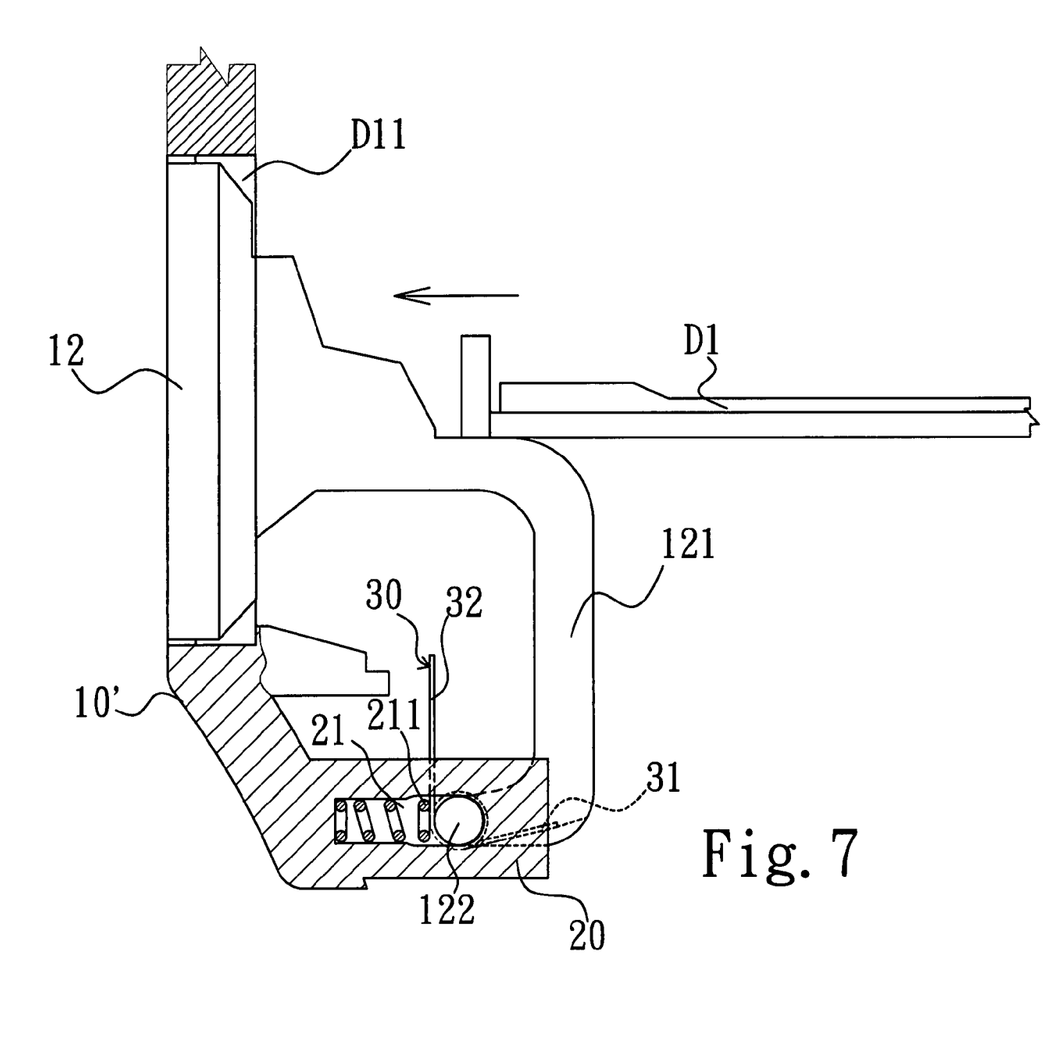
FIG. 7 is a cross-sectional view showing another embodiment of the tray door opening structure according to the present invention.

Next please refer to FIG. 7. FIG. 7 is a cross-sectional view showing another embodiment of the tray door opening structure according to the present invention.

In this embodiment, the front panel 10 of the optical disc device is a front panel 10' having a lower convergent edge and the other constituting members are the same as those recited in FIGS. 3 to 6.

According to the method for opening tray door of optical disc device and the structure used in the method of the present invention, the tray door 12 first moves horizontally to a position that no interference between the tray door 12 and the front panel 10' occurs and the tray door 12 then spins and opens. Accordingly, even in the optical disc device in which the front panel 10' has a convergent edge, the tray door 12 still moves horizontally in and along the guiding trench 21 through the assistance of the hinge 122 and then spins and opens. The rotating route of the tray door 12 would not interfere with the front panel 10'. Thus it is applicable to any single-tray type optical disc driver.

According to the method for opening tray door of optical disc device and the structure used in the method of the present invention, the tray door can move and spin without interfering with the front panel and thus the gap between the tray door and the front panel could be designed as small as possible.

While the present invention has been particularly shown and described with reference to exemplary embodiments thereof, it will be understood by those of ordinary skill in the art that various changes and modifications may be made therein without departing from the spirit and scope of the present invention as defined by the following claims.

What is claimed is:

1. A tray door opening structure for a tray carrying out from an optical disc device, the tray door opening structure is provided on the front panel of the device, the structure comprises:
   a tray door provided with at least one rotating arm in which one end of the rotating arm is further provided with a hinge;
   at least one guiding block provided on an inner wall of the front panel and having a guiding trench wherein the hinge is movably disposed in the guiding trench;
   at least one first elastic member provided in the guiding trench and positioned between the front panel and the hinge; and
   at least one second elastic member disposed on the hinge and has a first end and a second end, wherein the first end is fixed on the rotating arm and the second end is a free end;
   thereby when the tray is carried out, the tray pushes the tray door to allow the hinge moving in and along the guiding trench to press the first elastic member and guide the tray door moving outwardly and horizontally, in the meantime, the second end of the second elastic member is moved to push on the inner side of the front panel to allow the tray door spinning and opening by taking the hinge as a spinning axial.

2. The tray door opening structure of claim 1, wherein the coefficient of elasticity of the second elastic member is larger than that of the first elastic member.

3. The tray door opening structure of claim 1, wherein the first elastic member is a tension spring.

4. The tray door opening structure of claim 1, wherein the second elastic member is a torsion spring.

5. The tray door opening structure of claim 1, wherein the guiding trench is provided on the guiding block in a horizontal direction.

* * * * *